United States Patent [19]
Davisdon

[11] Patent Number: 5,224,187
[45] Date of Patent: Jun. 29, 1993

[54] FIBER OPTIC CABLE CONNECTORS PROVIDING STRAIN RELIEF

[75] Inventor: Gary A. Davisdon, Lilburn, Ga.

[73] Assignee: Scientific-Atlanta, Inc., Norcross, Ga.

[21] Appl. No.: 875,885

[22] Filed: Apr. 29, 1992

[51] Int. Cl.$^5$ ............................................. G02B 6/26
[52] U.S. Cl. ....................................... 385/87; 385/62; 385/66; 385/69; 385/81; 385/100
[58] Field of Search ................. 385/62, 66, 69, 76, 385/77, 81, 84, 86, 87, 100, 102, 107

[56] References Cited

U.S. PATENT DOCUMENTS

| | | | |
|---|---|---|---|
| 4,047,797 | 9/1977 | Arnold et al. | 385/87 |
| 4,247,163 | 1/1981 | Lumpp et al. | 385/137 |
| 4,447,120 | 5/1984 | Borsuk | 385/136 |
| 4,576,437 | 3/1986 | Ohta et al. | 385/87 |
| 4,588,256 | 5/1986 | Onstott et al. | 385/87 |
| 4,708,427 | 11/1987 | Ejiri et al. | 385/87 |
| 4,730,890 | 3/1988 | Kashimura et al. | 385/87 |
| 4,784,455 | 11/1988 | Sladen et al. | 385/87 |
| 4,795,229 | 1/1989 | Abendschein | 385/87 X |
| 4,815,808 | 3/1989 | Honma et al. | 385/69 |
| 4,815,810 | 3/1989 | Betzler et al. | 385/81 |
| 4,948,222 | 8/1990 | Corke et al. | 385/100 |
| 5,062,683 | 11/1991 | Grois et al. | 385/87 |
| 5,074,636 | 12/1991 | Hopper | 385/76 |
| 5,140,661 | 8/1992 | Kerek | 385/87 |
| 5,140,662 | 8/1992 | Kumar | 385/87 |
| 5,142,602 | 8/1992 | Cabato et al. | 385/87 |
| 5,166,997 | 11/1992 | Norland et al. | 385/87 |

FOREIGN PATENT DOCUMENTS 1186537  5/1985  Canada .................. 385/87 X

Primary Examiner—Brian Healy
Attorney, Agent, or Firm—William A. Marvin; Frederick W. Powers, III

[57] ABSTRACT

A fiber optic cable connector secures a fiber optic cable to an equipment housing (e.g., a CATV equipment housing) and allow individual fibers of the cable to pass into the housing in a strain relieved condition for connection to electro-optical componentry. A strength component of the fiber optic cable is clamped within the connector body, exterior of the equipment housing, to strain-relieve the optical fibers from forces imparted to the cable, without taking up housing space. Also, the connector clamps a strength component of a protective "fan-out" tube covering the individual fibers of the cable passing from the connector into the housing, to strain-relieve the fibers from forces imparted to the fan-out tube. The clamping action is effected by progressive threaded engagement of two connector bodies.

25 Claims, 4 Drawing Sheets

FIBER OPTIC CABLE CONNECTORS PROVIDING STRAIN RELIEF

BACKGROUND OF THE INVENTION

This invention relates to fiber optic cable connectors for coupling a fiber optic cable to related equipment and strain relieving the optical fibers of the cable. More specifically, the invention relates to connectors particularly suited for securing a fiber optic cable to a conventional CATV equipment housing and passing in a strained relieved condition the optical fibers of the cable into the housing for connection to electro-optical componentry.

The use of optical fibers for transmission of CATV signals has numerous advantages over conventional radio frequency (RF) signal transmission through coaxial cable. For example, optical fibers intrinsically have more information carrying capacity than do coaxial cables. In addition, there is less signal attenuation in optical fibers than in coaxial cables adapted for carrying RF signals. Consequently, optical fibers can span much longer distances between signal amplifiers than is possible with coaxial cables. Further, the dielectric nature of optical fiber eliminates any problem with electrical shorting. Finally, optical fiber is immune to ambient electromagnetic interference (EMI) and generates no EMI of its own. Accordingly, fiber optic technology is, more and more, replacing RF technology in the CATV industry.

Conversion to fiber optic technology in the CATV industry is hampered by the significant expense involved with replacing existing RF signal transmission equipment, e.g., coaxial cables, amplifiers and splitters, with fiber optic cables and equipment. As the industry converts to optical fiber technology, it is desirable to utilize existing RF signal equipment to the greatest extent possible to reduce costs. Accordingly, the industry trend is to utilize optical fiber cable for transmitting CATV signals from a centrally located station (headend) over large distances to a number of sub-stations (remote hubs) which may, e.g., be located in various cities. At the remote hubs, the optical signals are reconverted back into RF signals, amplified and split off to relatively short coaxial feeder lines, typically using an optoelectronic bridger amplifier (OEBA). This way, the advantages of optical fiber signal transmission are realized without the expense of replacing the vast networks of coaxial cable and related equipment which bring the CATV signal to individual receiving locations, e.g., residences.

In interest of efficiency, it is desirable to adapt existing CATV equipment housings, e.g., junction boxes, trunk housings and the like, for housing and protecting fiber optic componentry (e.g., OEBA's, amplifiers, splitters, etc.) to which the optic fibers are fed. In such arrangements, it is necessary to secure the end of the fiber optic cable to the equipment housing in such a manner that one or more optical fibers of the cable can pass into the housing and be connected to components therein in a strain-relieved condition. Conventionally, this has been achieved by clamping a strength member of the cable, e.g., Kevlar strands or metal wires, to a floor of the housing such that forces imparted to the cable, e.g., due to the weight of the cable and thermal expansions and contractions thereof, are conveyed to the housing rather than the fragile optical fibers. A problem with this approach for providing strain-relief is that space within the housing must be utilized for securing the cable. Hence, the amount of space available for electro-optical componentry is reduced.

Hopper U.S. Pat. No. 5,074,636 describes a fiber optic cable entry connector which, by securing the cable within the connector exterior of a trunk housing, addresses the above-described problem. This connector is threadably securable in an aperture of the trunk housing and provides strain-relief by grasping a strength member of the fiber optic cable with a screw-actuated clamp positioned within the connector body. The following patents describe other fiber optic cable connectors which capture a strength member of the fiber optic cable in order to provide strain-relief: Corke et al. U.S. Pat. No. 4,948,222; Betzler et al. U.S. Pat. No. 4,815,810; Honma et al. U.S. Pat. No. 4,815,808; Kashimura et al. U.S. Pat. No. 4,730,890; Ejiri et al. U.S. Pat. No. 4,708,427; Ohta et al. U.S. Pat. No. 4,576,437; Borsuk U.S. Pat. No. 4,447,120; and Lumpp et al. U.S. Pat. No. 4,247,163.

Due possibly to such factors as incompatibility with existing CATV equipment, expense, difficulty of installation, size and insufficient strain-relieving strength, the connector designs disclosed in the above patents have not achieved widespread acceptance and usage in the CATV industry. Rather, the industry has continued to rely primarily upon the above-described method of providing strain-relief by securing the fiber optic cable to the floor of the equipment housing, with its attendant disadvantage of taking up space within the housing. There thus exists a need for a fiber optic cable connector which can reliably secure a fiber optic cable to a conventional CATV equipment housing and thereby strain-relieve the optical fibers without taking up housing space, which is inexpensive to manufacture, compact, and can be easily installed.

Conventionally, the individual optical fibers of the cable extending from the connector into the equipment housing for connection to an OEBA or other components are enclosed by a protective "fan-out" tube. Such a tube typically comprises an outer polymeric skin, Kevlar strands acting as a strength member and an inner plastic core for housing and cushioning the individual fibers. None of the above patents addresses the need to strain-relieve the optical fibers from tensile forces imparted to such protective tubing. Conventional practice has been to secure the fan-out tubing to the housing by clamping it to an inner wall portion thereof. This approach also undesirably takes up space within the housing. There is therefore a need for a connector which provides complete strain-relief to the optical fibers by securing therein both a fiber optic cable extending into the connector and a protective tubing covering the individual optical fibers passing out of the connector.

SUMMARY OF THE INVENTION

It is therefore an object of the present invention to provide an fiber optic cable connector for connecting a fiber optic cable to a structural member such as a housing and passing out of the connector in a strain-relieved condition fibers of the cable for connection to componentry, e.g., located within the housing.

It is a further object of the invention to provide a fiber optic cable connector which strain-relieves the optical fibers from both tensile forces imparted to the fiber optic cable and tensile forces imparted to a protective tubing covering the individual fibers passing out of the connector.

It is yet a further object of the present invention to provide a fiber optic cable connector which is simple in construction, inexpensive to manufacture, easy to install and reliable in use.

It is another object of the present invention to provide a fiber optic cable connector particularly suited for strain-relieving a fiber optic cable having a strength member in the form of two large wires extending along the cable.

It is yet another object of the invention to provide a fiber optic cable connector particularly suited for providing strain-relief to a fiber optic cable having a strength member in the form of aramid (e.g., Kevlar) strands.

These and other objects are achieved by the present invention which provides a fiber optic cable connector for securing a fiber optic cable to a structural member, e.g., a housing, and passing in a strain-relieved condition at least one optical fiber of the cable out of the connector for connection to componentry associated with the structural member. The connector comprises a first connector body coaxially insertable over a stripped end portion of the cable such that a casing of the cable extends into the first connector body, and a second connector body coaxially insertable over the stripped end portion of the cable such that at least one optical fiber of the cable extends out of the second connector body. The second connector body is threadably engageable with the first connector body. Attachment means are provided for securing the connector to the structural member and allowing the at least one optical fiber to pass out of the connector to the componentry. Clamping or locking means are provided for securely clamping or locking within the connector a strength component of the cable to thereby strain relief the at least one optical fiber.

In one aspect of the present invention, the at least one optical fiber passes out of the connector to the componentry within a protective tube covering the at least one optical fiber, and second clamping means are provided for securely clamping within the connector a strength component of the protective tube to strain-relieve the at least one optical fiber extending therein from forces imparted to the protective tube.

In a second aspect of the present invention, a clamping means is actuated by progressive threaded engagement of the first and second connector bodies for securely clamping within a connector a strength component of the cable to thereby strain relieve the at least one optical fiber. The clamping means comprises first and second compression blocks coaxially insertable over the stripped end portion of the cable adjacent to each other and between the first and second connector bodies such that opposing surfaces of the first and second compression blocks form clamping surfaces for clamping therebetween the strength component of the cable. The first and second clamping blocks are insertable into an axial cavity provided in one of the first and second connector bodies and are compressible within said one connector body as the other connector body is progressively threadably engaged with the one connector body.

In a third aspect of the present invention, a locking means is actuated by progressive threaded engagement of the first and second connector bodies for locking onto a terminal portion of a wire strengthening member a deformable ferrule and trapping the ferrule within the connector to thereby strain relieve the at least one optical fiber.

These and other objects and features of the present invention will be apparent and fully understood from the following detailed description of the preferred embodiments, taken in connection with the appended drawings.

DETAILED DESCRIPTION OF THE PREFERRED EMBODIMENTS

Figure 1:
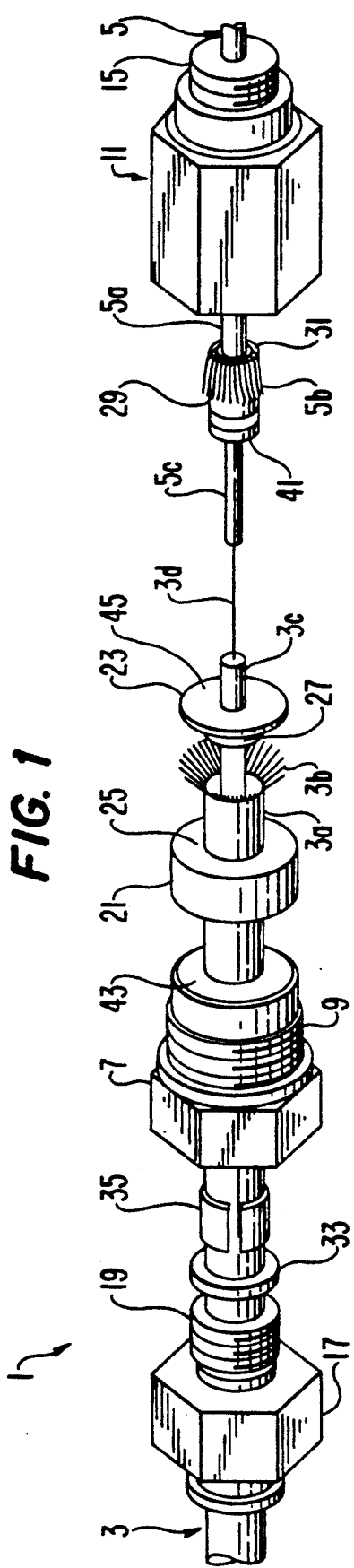
FIG. 1 is an exploded perspective view of a first fiber optic cable connector of the present invention, showing also a stripped end of the fiber optic cable, and a protective fan-out tube covering the optical fiber passing out of the connector.
Figure 2:
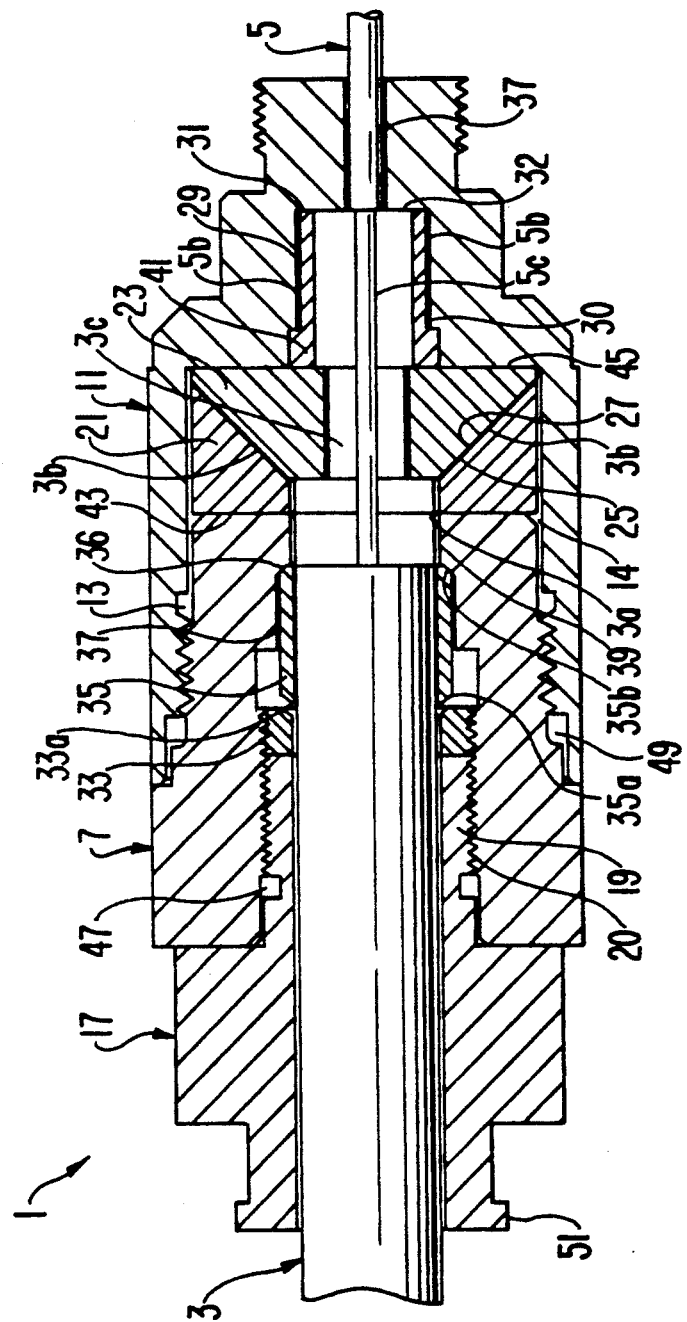
FIG. 2 is a cross-sectional view of the connector of FIG. 1, fully assembled with the fiber optic cable and fan-out tube.

FIGS. 1 and 2 illustrate a first connector assembly 1 in accordance with the present invention. Referring specifically to FIG. 1, the connector components are shown exploded along a stripped end portion of a conventional outdoor grade fiber optic cable 3 (such as manufactured by Siecor Corporation of Hickory, N.C.) comprising an outer jacket 3a, e.g., of high density polyethylene, aramid (e.g., Kevlar) strands 3b acting as a tensile strength component of the cable, an inner plastic tube 3c, and individual glass fibers 3d (only one illustrated). Also depicted as part of the assembly is a conventional protective "fan-out" tube 5 (e.g., as also manufactured by Siecor Corporation) which is inserted over the bare optical fibers 3d passing out of the connector and into an equipment housing (not shown) for connection to elecro-optical componentry. Fan-out tube 5 similarly comprises an outer jacket 5a, aramid strands 5b acting as a tensile strength member, and an inner plastic tube 5c.

Connector 1 comprises three threadably engageable connector bodies having hex-nut outer gripping surfaces. Specifically, a first connector body 7 has outer (male) threads 9 for threadably engaging a second connector body 11 via inner (female) threads 13 provided in a large diameter portion 14 of a stepped axial bore or passageway provided through connector body 11 (see FIG. 2). A forward end 15 of connector body 11 is threaded for receipt within a threaded aperture of a structural member such as a conventional CATV equipment housing. A third connector body 17 has a threaded end portion 19 for being threadably received within a large diameter end portion 20 of a stepped axial bore extending through connector body 7 (see FIG. 2).

Between connector bodies 7 and 11 along the stripped end of cable 3 can be seen two annular compression blocks 21 and 23. Block 21 has a forward end face 25 that is recessed in the shape of a truncated cone and adapted to mate with a truncated conical end face 27 of block 23. Blocks 21 and 23 are sized to be retained within large diameter portion 14 of connector body 11. Mating surfaces 25 and 27 form clamping surfaces for clamping therebetween aramid fibers 3b to secure cable 3 to connector 1 as will be described in detail hereinafter. Shown mounted on the stripped end of fan-out tube 5, next to connector body 11, is a hollow pin member 29 which is insertable into an intermediate diameter portion 30 of the stepped axial bore extending through connector body 11 (see FIG. 2). Pin member 29 serves to capture, between its annular end 31 and an annular shoulder surface 32 of the stepped axial bore in connector body 11 (see FIG. 2), aramid strands 5b to secure fan-out tube 5 within the connector as will be described in detail hereinafter.

Threaded coaxially onto cable 3 between connector bodies 9 and 17 is an externally threaded ring nut 33 and a split-ring 35. These components fit within connector body 7 ahead of threaded end 19 and serve as part of anti-rotation means for preventing the end of cable 3 from rotating relative to connector 1, as will be described in detail hereinafter.

Referring specifically now to FIG. 2, connector 1 is shown fully assembled onto respective stripped ends of cable 3 and fan-out tube 5. Cable 3 is stripped so that outer jacket 3a extends into connector body 11 and abuts with the truncated top of compression block 23. Exposed aramid fibers 3b are splayed outwardly and extend up between the mating conical surfaces 25, 27 of compression blocks 21 and 23, and are thus clamped therebetween at an oblique angle, e.g., 45°, relative to the longitudinal axis of cable 3. The exposed end of inner plastic tube 3c preferably extends through compression block 23 and terminates within pin member 29. A length of bare optical fibers 3d, e.g., 1 meter, would typically pass out of the connector and into an equipment housing for attachment to electro-optical componentry such as OEBA's, splitters, amplifiers, etc. To protect the bare optical fibers 3d, fan-out tube 5 is inserted thereover, and has a stripped end inserted into a rightmost small diameter portion 37 of the stepped axial bore extending through connector body 11. Fan-out tube 5 is stripped so that outer jacket 5a terminates adjacent to annular end 31 of pin 29. A length of exposed aramid fibers 5b (e.g., 1") extends between pin end 31 annular shoulder 32 of connector body 11, and up along the cylindrical walls of pin 29, to enable fibers 5b to be clamped between pin end 31 and shoulder 32 when connector bodies 7 and 11 are threadably engaged with each other. The exposed end portion of fan-out inner plastic tube 5c extends into cable inner plastic tube 3c such that optical fibers 3d pass smoothly and securely into fan-out tube 5 and are protected along their entire length.

In the assembled state of FIG. 2, the end of cable 3 is prevented from even small rotations relative to connector 1 by split-ring 35 firmly gripping outer jacket 3a and being securely bound within connector body 7. In particular, split-ring 35 is elastically compressible onto cable 3, and has an inner surface which is knurled or otherwise roughened for gripping outer jacket 3a. To compress split-ring 35, opposite end surfaces 35a,35b of split-ring 35 taper inwardly to engage, respectively, with a chamfered edge 33a on ring nut 33 and a chamfered shoulder 36 provided between an intermediate diameter bore portion 37 of connector body 7, and a small diameter bore portion 39 thereof. Threaded engagement of connector body 17 with connector body 7 compress split-ring 35 onto cable 3 and binds split-ring 35 between shoulder 36 and ring nut 33.

Ring nut 33 serves to retain split-ring 35 within connector body 7 prior to assembly. It is threadably engageable with the threads of large diameter bore portion 20 and advanceable therethrough into a non-threaded cut-away area where it sits loosely to prevent split-ring 35 from falling out of connector body 7 before connector body 17 is threadably engaged with connector body 7. Ring nut 33 could be omitted with the attendant loss of its retaining function. In such a case, split-ring tapered edge 35a could be contacted directly by the annular end surface of connector body threaded end portion 19 to compress split-ring 35 onto cable 3 and bind split-ring 35 within connector body 7. Other techniques for pre-assembly retention of split-ring 35 within connector body 7 will be apparent to those of ordinary skill in the art.

A process of installing connector 1, and the specific manner in which cable 3 and fan-out tube 5 are secured therein, are now described.

First, a piece of fan-out tubing 5 is cut to the required length, and the end is stripped and dressed so that a length (e.g., ½") of aramid strands 5b extend from outer jacket 5a. The exposed end of inner plastic tube 5c should be of sufficient length (e.g., 2"-4") to allow it to enter and extend a distance within inner plastic tube 3c of cable 3. Pin member 29 is placed over inner plastic tube 5c with its annular end 31 abutting against aramid strands 5b, and is then inserted into intermediate diameter bore portion 30 of connector body 11. At this point, because of the space taken up by aramid strands 3c, an enlarged (e.g., oval) head portion 41 of pin 29 will protrude slightly from a correspondingly enlarged (countersunk) end of bore portion 30. In this state, threaded end portion 15 of connector body 11 may be threaded into a corresponding bore provided in a structural member such as a CATV equipment housing.

Connector body 17 and then connector body 7, with ring nut 19 and split ring 13 retained therein, are threaded over cable outer jacket 3a. Connector bodies 7 and 17 may then be loosely threadably engaged with each other. The end of fiber optic cable 3 is then stripped and dressed such that appropriate lengths of optic fibers 3d, inner plastic tubing 3c and aramid strands 3b are exposed.

The next step is to thread compression blocks 21 and 23 onto cable 3 such that these components assume the positions shown in FIG. 1, behind and in front of splayed aramid strands 3b, respectively. Next, the exposed glass fibers 3d are threaded into the exposed end of inner plastic tube 5c which protrudes from the assembly of connector body 11 and pin 29. With aramid strands 3b held between blocks 21 and 23, the stripped end of cable 3, along with blocks 21 and 23, is inserted into connector body 11. The protruding portion of fan-out inner plastic tube 5c is allowed to pass into cable inner plastic tube 3c and compression block 23 is allowed to seat against slightly protruding head 41 of pin 29.

Connector body 7 is then progressively threadably engaged with connector body 11. This causes forward end 43 of connector body 7 to abut against compression block 21, whereafter further progressive threaded engagement of connector bodies 7 and 11 effects a clamping of aramid strands 3b between compression block surfaces 25 and 27. The 45° angle of surfaces 25 and 27 facilitates proper placement of aramid strands 3b therebetween, and at the same time efficiently translates the compressive forces generated by the progressive threaded engagement of connector bodies 7 and 11 into clamping strength. The clamping strength of connector 1 is sufficient to withstand tensile forces imparted to the cable of at least 100 lbs. Such forces will be transmitted to the structural member (e.g., a housing) to which connector 1 is attached, so that the fragile optical fibers 3d are effectively strain-relieved.

At the same time, the progressive threaded engagement of connector bodies 7 and 11 causes the forward flat surface 45 of compression block 23 to abut with enlarged head 41 of pin 29. In this manner, the compressive forces generated by progressively threadably engaging connector bodies 7 and 11 are transmitted to pin member 29 causing fan-out tube aramid strands 5b to be clamped between pin end 31 and the annular shoulder surface 32 of connector body 11. Typically, tensile forces imparted to the fan-out tube will not exceed 20 lbs. The fan-out tube clamping arrangement of connector 1 can easily withstand at least this much force.

The final assembly step is to threadably engage connector body 17 with connector body 7. As these two pieces are progressively threadably engaged, split-ring 35 is compressed onto cable outer jacket 3a and bound within connector body 7 between ring nut 33 and chamfered shoulder 36. In this manner cable 3 is effectively prevented from rotating relative to connector 1.

Except for compression blocks 21 and 23, the components of connector 1 are preferably machined from aluminum stock, which is easy to machine, resists corrosion, and can provide EMI/RFI shielding to an equipment housing to which the connector is attached. Compression blocks 21 and 23 are preferably formed of softer metal, such as brass, that will deform slightly to close any gaps between surfaces 25 and 27 resulting from machining imperfections and thereby enhance the clamping of aramid strands 3b therebetween. Other suitable materials and manufacturing techniques will be apparent to those of ordinary skill in the art.

The two interfaces between the three connector bodies are preferably weather sealed by O-rings (not shown) positioned within O-ring grooves 47 and 49 provided in connector bodies 17 and 7, respectively. The entry point of cable 3 into connector body 17 may be sealed by shrinking thereon a conventional plastic shrink-wrap tube. To this end, the rear portion of connector body 17 is formed with an upturned lip or flange 51 to enhance the grip of the shrink-wrap tube.

Figure 3:
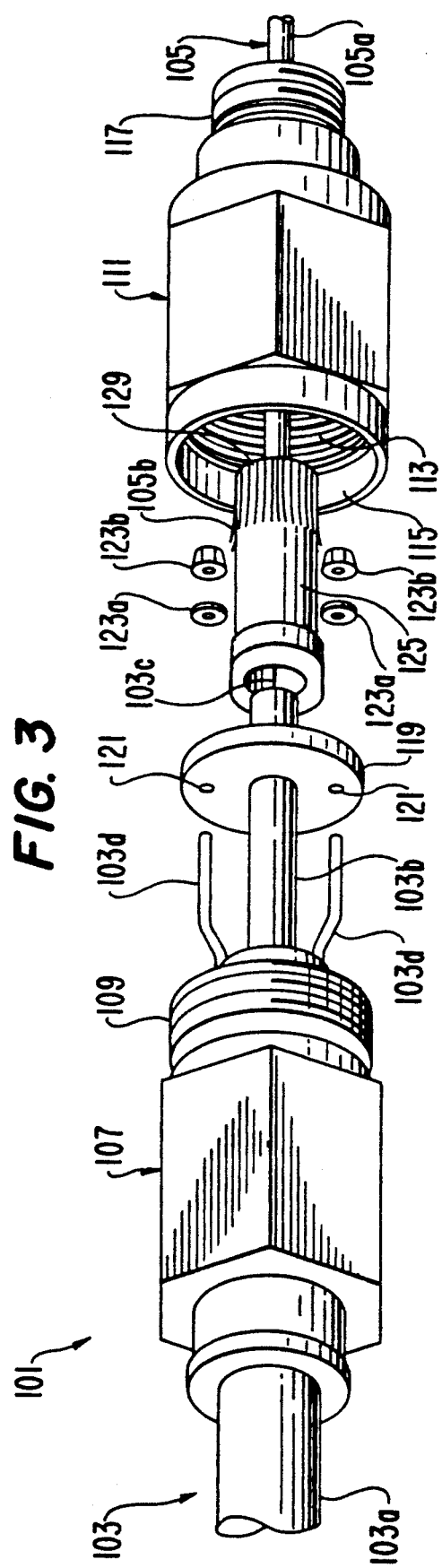
FIG. 3 is an exploded perspective view of a second fiber optic cable connector of the present invention, showing also a stripped end of the fiber optic cable, and a protective fan-out tube covering the optical fiber passing out of the connector.
Figure 4:
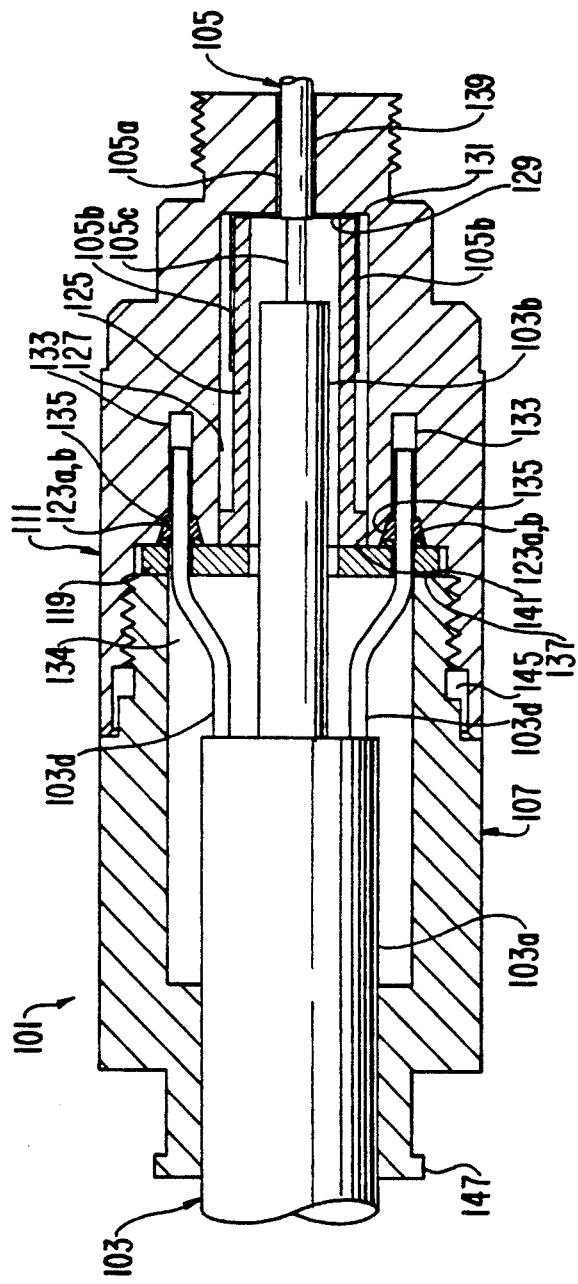
FIG. 4 is a cross-sectional view of the connector of FIG. 3, fully assembled with the fiber optic cable and fan-out tube.
Figure 5:
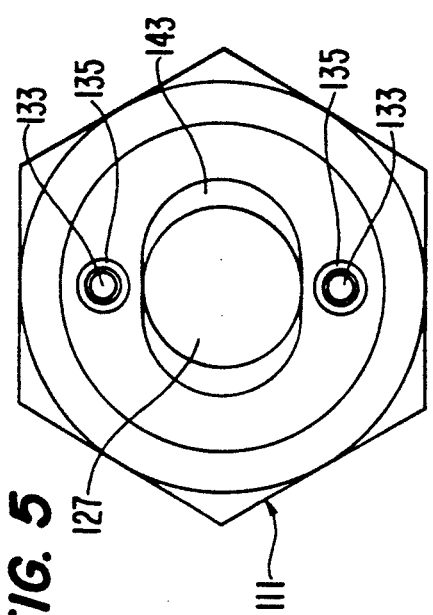
FIG. 5 is an end elevation view of a second connector body of the connector of FIGS. 3 and 4.

FIGS. 3-5 illustrate a second connector assembly 101 in accordance with the present invention. Referring specifically to FIG. 3, the connector components are shown exploded along a stripped end portion of a conventional outdoor grade fiber optic cable 103. Cable 103 comprises, similar to cable 3 of the first embodiment, an outer jacket 103a, and inner plastic tube 103b and individual glass fibers 103c (only one shown). In place of aramid strands, cable 103 has as a tensile strength member two large wires 103b extending within outer casing 103a along opposite sides of inner plastic tube 103b. Such a cable is, e.g., manufactured by AT&T.

Also depicted as part of the assembly is a conventional protective "fan-out" tube 105 which is inserted over the bare fibers 103c passing out of the connector and into an equipment housing (not shown) for connection to electro-optical componentry. Fan-out tube 105, like fan-out tube 5, comprises an outer jacket 105a, aramid strands 105b acting as a tensile strength member, and an inner plastic tube 105c (see FIG. 4).

Connector 101 comprises two threadably engageable connector bodies having hex-nut outer gripping surfaces. A first connector body 107 has a threaded end portion 109 for threadably engaging a second connector body 111 via threads 113 provided in a large diameter portion 115 of a stepped axial bore or passageway extending through connector body 111. The forward end 117 of connector body 111 is threaded for receipt within a threaded aperture of a structural member such as a conventional CATV equipment housing.

Between connector bodies 107 and 111, and threaded onto the exposed end portion of inner plastic tube 103b is a washer-like compression plate 119 having spaced apertures 121 through which wire strength members 103d may freely pass. Also shown as being threadable onto wire strength members 103d in front of compression plate 119 is a pair of conventional two piece compression ferrules 123a,b (e.g., as manufactured by Crawford Fitting Company of Solon, Ohio and sold as hydraulic tube fittings under the trademark "Swagelok"). Ferrules 123a,b are deformably secured upon wire strength members 103d and locked within connector body 111 to thereby strain-relieve optical fibers 103c from tensile forces imparted to cable 103, as will be described in detail hereinafter. Shown mounted on the stripped end of fan-out tube 105 is a hollow pin member 125 which is insertable into an intermediate diameter portion 127 of the stepped axial bore extending through connector body 111 (see FIG. 4). Similar to the first embodiment, pin member 125 serves to capture, between its annular end 129 and an inner annular shoulder surface 131 of connector body 111 (see FIG. 4), aramid strands 105b to secure fan-out tube 105 within connector 101 as will be described in detail hereinafter.

Referring specifically now to FIG. 4, connector 101 is shown fully assembled onto respective stripped ends of cable 103 and fan-out tube 105. Cable 103 is stripped so that outer jacket 103a terminates within connector body 107. Exposed wire strength members 103d extend out of outer casing 103a and into respective spaced bores 133 (seen head-on in FIG. 5) which open into large diameter bore portion 134 of connector body 111. Two-part ferrules 123a,b are locked onto wire strength members 103d, within correspondingly shaped chamfered ends 135 of spaced bores 133, by compression plate 119 which is pressed against the bottom of large diameter bore portion 134 by an annular end face 137 of connector body 107 as connector bodies 107 and 111 are progressively threadably engaged with each other.

Ferrules 123a,b comprise a tapered stainless steel ring 123a which engages in the enlarged end of a second, larger, tapered brass ring 123b. When the ferrule assembly 123a,b is subjected to compression in an axial direction, the ferrule pieces are crushed together resulting in a reduction in the size of the passage therethrough. At the same time, the size of the passage is also reduced by deformation of larger ring 123b resulting from the inwardly directed forces imparted to the tapered surface thereof by the walls of chamfered opening 135. Known single piece compression ferrules providing only the second mode of gripping action could be used instead of two piece ferrules 123a,b.

The exposed end of cable inner plastic tube 103b extends through compression plate 119 and into hollow pin member 125. Bare optical fibers 103c would typically pass out of the connector and into an equipment housing for attachment to electro-optical componentry. To protect bare optical fibers 103c, fan-out tube 105 is inserted thereover and has a stripped end inserted into a rightmost small diameter portion 139 of the stepped axial bore extending through connector body 111. Fan-out tube 105 is stripped so that outer jacket 105a terminates adjacent to annular end 129 of pin member 125. Exposed aramid fibers 105b extend between pin end 129 and annular shoulder 131 of connector body 111, and up along the cylindrical walls of pin 125, to be clamped between pin end 129 and shoulder 131 as connector bodies 107 and 111 are progressively threadably engaged with each other. The exposed end of fan-out inner plastic tube 105c extends into cable inner plastic tube 103b such that optical fibers 103d pass smoothly and securely into fan-out tube 5 and are protected along their entire length.

A process of installing connector 101, and the specific manner in which cable 103 and fan-out tube 105 are secured therein, are now described.

First, a piece of fan-out tube 105 is cut to the required length, and the end is stripped and dressed so that appropriate lengths of aramid strands 105b and inner plastic tube 105c are exposed. Pin member 125 is placed over inner plastic tube 105c with its annular end 129 abutting against aramid strands 105b, and is then inserted into intermediate diameter bore portion 127 of connector body 111. At this point, because of the space taken up by aramid strands 105b, an enlarged (e.g., oval) head portion 141 of pin 125 will protrude slightly from a correspondingly enlarged (counter sunk) end 143 of intermediate diameter bore portion 127 seen most clearly in FIG. 5. At this stage, threaded end portion 117 of connector body 111 may be threaded into a corresponding bore provided in a structural member such as a CATV housing.

The end of fiber optic cable 103 is fed through connector body 107, and then is stripped and dressed such that appropriate lengths of optic fibers 103d, inner plastic tubing 103b and wire strength members 103d are exposed. Next, compression plate 119 is threaded over bare fibers 103c and pushed onto inner plastic tube 103b such that wire strength members 103d pass through apertures 121. At this point, two piece compression ferrules 123a,b are threaded onto the ends of wire strength members 103d. The assembly of inner plastic tube 103b, wire strength members 103d, compression plate 121 and ferrules 123a,b is then inserted into connector body 111 such that wire strength members 103d extend into spaced bores 133 and ferrules 123a,b seat within chamfered openings 135. At this point, connector body 107 is threadably engaged with connector body 111. Progressive threaded engagement of connector bodies 107 and 111 causes annular end face 137 of connector body 107 to abut against compression plate 119 and advance the same to compress two-part ferrules 123a,b against chamfered openings 135 such that the ferrule assemblies are secured to wire strength members 103d and locked within bores 133.

At the same time, the progressive threaded engagement of connector bodies 107 and 111 causes an inner portion of compression plate 119 to abut with enlarged head 141 of pin 125. In this manner, the compressive force generated by progressively threadably engaging connector bodies 107 and 111 is transmitted to pin member 125 causing fan-out tube aramid strands 105b to be clamped between pin end 129 and the annular shoulder surface 131 of connector body 111.

As with the first embodiment, the clamping strength of connector 101 is sufficient to withstand tensile forces imparted to the cable of at least 100 lbs., and tensile forces imparted to the fan-out tube of at least 20 lbs. In the second embodiment, since wire strength members 103d are substantially rigid and inserted into bores 133, even small rotations of cable 103 relative to connector 101 are prevented, without the need for additional structure.

Connector bodies 107 and 111, and pin 125 are preferably machined from aluminum stock. Compression plate 119 is preferably formed of a harder metal such as stainless steel to enhance its ability to compress ferrules 123a,b.

The interface between connector bodies 107 and 111 is preferably weather sealed by an O-ring (not shown) positioned within an O-ring groove 145. To facilitate retention of a shrink-wrap tube applied to the rear end of connector body 107 for sealing the entry point of cable 103 into connector body 107, the rear portion of connector body 107 is formed with an up-turned lip or flange 147.

The invention has been described in terms of presently preferred embodiments thereof. Other embodiments within the scope and spirit of the present invention as defined in the appended claims will occur to those having ordinary skill in the art upon reading this disclosure.

I claim:

1. A fiber optic cable connector for securing a fiber optic cable to a structural member and passing in a strain relieved condition at least one optical fiber of said cable out of said connector for connection to componentry associated with said structural member, said connector comprising:

a first connector body coaxially insertable over a stripped end portion of said cable such that a casing of said cable extends into said first connector body;

a second connector body coaxially insertable over said stripped end portion of said cable such that said at least one optical fiber of said cable extends out of said second connector body, said second connector body being threadably engageable with said first connector body;

attachment means for securing the connector to said structural member and allowing said at least one optical fiber to pass out of said connector to said componentry within a protective tube covering said at least one optical fiber and extending into said connector;

first clamping means for securely clamping within said connector a strength component of said cable to thereby strain relieve said at least one optical fiber against stresses imparted to said cable; and second clamping means for securely clamping within said connector a strength component of said protective tube to strain relieve the at least one optical fiber extending therein from stresses imparted to said protective tube.

2. A fiber optic cable connector according to claim 1, wherein said second clamping means is actuated by progressive threaded engagement of said first and second connector bodies.

3. A fiber optic cable connector according to claim 2, further comprising a pin member insertable into an enlarged portion of an axial passageway extending through said second connector body, said second clamping means comprising an annular shoulder surface formed between said enlarged portion of said axial passageway and a smaller portion thereof, and an end surface of said pin member which abuts with said shoulder surface, whereby force generated by progressively threadably engaging said first and second connector bodies is transmitted from said first connector body to said pin member to create a clamping force between said annular shoulder surface and the end surface of said pin member.

4. A fiber optic cable connector according to claim 1, further comprising anti-rotation means for securing the casing of said cable to the connector to prevent rotation of the cable relative to the connector.

5. A fiber optic cable connector for securing a fiber optic cable to a structural member and passing in a strain relieved condition at least one optical fiber of said cable out of said connector for connection to componentry associated with said structural member, said connector comprising:

- a first connector body coaxially insertable over a stripped end portion of said cable such that a casing of said cable extends into said first connector body;
- a second connector body coaxially insertable over said stripped end portion of said cable such that said at least one optical fiber of said cable extends out of said second connector body, said second connector body being threadably engageable with said first connector body;
- attachment means for securing the connector to said structural member and allowing said at least one optical fiber to pass out of said connector to said componentry; and
- clamping means actuated by progressive threaded engagement of said first and second connector bodies for securely clamping within said connector a strength component of said cable to thereby strain relieve said at least one optical fiber, said clamping means comprising:
- first and second compression blocks coaxially insertable over said stripped end portion of said cable adjacent to each other and between said first and second connector bodies such that opposing surfaces of said first and second compression blocks from clamping surfaces for clamping therebetween said strength component of the cable, said first and second compression blocks being insertable into an axial cavity provided in one of said first and second connector bodies and being compressible within the axial cavity of said one connector body as the other connector body is progressively threadably engaged within said one connector body.

6. A fiber optic cable connector according to claim 5, wherein said attachment means comprises a threaded end portion of said second connector body for threadably engaging a threaded aperture provided in said structural member, said threaded end portion providing a passageway for said at least one optical fiber to pass through said structural member for connection to said componentry.

7. A fiber optic cable connector according to claim 5, further comprising additional clamping means for securely clamping within said connector a strength member of a protective tube extending into said second connector body and covering a stripped end portion of said at least one optical fiber.

8. A fiber optic cable connector according to claim 7, wherein said additional clamping means is actuated by said progressive threaded engagement of said first and second connector bodies.

9. A fiber optic cable connector according to claim 8, further comprising a pin member insertable into an enlarged portion of an axial passageway extending through said second connector body, said additional clamping means comprising an annular shoulder surface formed between said enlarged portion of said axial passageway and a smaller portion thereof, and an end surface of said pin member which abuts with said shoulder surface, whereby force generated by progressively threadably engaging said first and second connector bodies is transmitted from said first connector body to said pin member to create a clamping force between said annular shoulder surface and the end surface of the pin member.

10. A fiber optic cable connector according to claim 9, wherein a forwardmost side of a forwardmost one of said compression blocks contacts an end portion of the pin member when the first and second connector bodies are progressively threadably engaged, to thereby transmit said force from the first connector body to the pin member.

11. A fiber optic cable connector according to claim 5, further comprising anti-rotation means for securing the casing of said cable to the connector to prevent rotation of the cable relative to the connector.

12. A fiber optic cable connector according to claim 11, wherein said anti-rotation means comprises a split ring which is coaxially insertable onto said cable casing and into an axial bore of said first connector body, and a third connector body having an end portion which is threadably engageable with said first connector body such that progressive threaded engagement of said first and third connector bodies binds securely together the cable casing, split ring and first connector body, whereby said cable is secured against rotation relative to said connector.

13. A fiber optic cable connector according to claim 12, wherein said axial bore comprises a threaded cylindrical portion and non-threaded cylindrical portion, and said anti-rotation means further comprises a ring nut which is threadably engageable with said threaded cylindrical portion and advanceable therethrough into said non-threaded portion to retain the split ring.

14. A fiber optic cable connector according to claim 12, wherein said axial bore comprises a chamfered surface against which said split ring is forced by the progressive threaded engagement of said first and third connector bodies, whereby said split ring is caused to grip said casing.

15. A fiber optic cable connector for securing a fiber optic cable having a casing with at least one wire strengthening member extending along its length to a structural member and passing in a strain relieved condition at least one optical fiber of said cable out of said connector for connection to componentry associated with said structural member, said connector comprising:

- a first connector body coaxially insertable over a stripped end portion of said cable such that the casing of said cable extends into said first connector body;
- a second connector body coaxially insertable over said stripped end portion of said cable such that said at least one optical fiber of said cable extends out of said second connector body, said second connector body being threadably engageable with said first connector body;

attachment means for securing the connector to said structural member and allowing said at least one optical fiber to pass out of said connector to said componentry; and locking means actuated by progressive threaded engagement of said first and second connector bodies for locking onto a terminal portion of said wire strengthening member a deformable ferrule and trapping said ferrule within said connector to thereby strain relieve said at least one optical fiber.

16. A fiber optic cable connector according to claim 15, wherein said attachment means comprises a threaded end portion of said second connector body for threadably engaging a threaded aperture provided in said structural member, said threaded end portion providing a passageway for said at least one optical fiber to pass through said structural member for connection to said componentry.

17. A fiber optic cable connector according to claim 15, wherein said locking means comprises:

a bore extending into a rear surface of the second connector body for accommodating therein said terminal portion of said wire strengthening member and a ferrule inserted over said terminal portion; and a compression plate mountable between said first and second connector bodies with said wire strengthening member extending therethrough, for transmitting to said ferrule compressive force generated by said progressive threaded engagement of said first and second connector bodies to thereby compress said ferrule into said bore to securely engage said ferrule with said wire strengthening member, and to compressively retain said ferrule and terminal portion of the wire strengthening member within said bore.

18. A fiber optic cable connector according to claim 15, wherein said locking means comprises:

a pair of bores extending into a rear surface of the second connector body for accommodating respectively therein terminal portions of a pair of said wire strengthening members and a pair of ferrules inserted respectively over said terminal portions;

a compression plate mountable between said first and second connector bodies with said pair of wire strengthening members extending therethrough, for transmitting to said ferrules compressive force generated by said progressive threaded engagement of said first and second connector bodies to thereby compress said ferrules into respective said bores to securely engage said ferrules with respective said wire strengthening members, and to compressively retain said ferrules and wire strengthening member end portions within said bores.

19. A fiber optic cable connector according to claim 15, further comprising clamping means for securely clamping within said connector a strength member of a protective tube extending into said second connector body and covering a stripped end portion of said at least one optical fiber.

20. A fiber optic cable connector according to claim 19, wherein said clamping means is actuated by progressive threaded engagement of said first and second connector bodies.

21. A fiber optic cable connector according to claim 20, further comprising a pin member insertable into an enlarged portion of an axial passageway extending through said second connector body, said clamping means comprising an annular shoulder surface formed between said enlarged portion of said axial passageway and a smaller portion thereof, and an end surface of said pin member which abuts with said shoulder surface, whereby force generated by progressively threadably engaging said first and second connector bodies is transmitted from said first connector body to said pin member to create a clamping force between said annular shoulder surface and the end surface of the pin member.

22. A fiber optic cable connector according to claim 16, further comprising clamping means for securely clamping within said connector a strength member of a protective tube extending into said second connector body and covering a stripped end portion of said at least one optical fiber.

23. A fiber optic cable connector according to claim 22, wherein said clamping means is actuated by progressive threaded engagement of said first and second connector bodies.

24. A fiber optic cable connector according to claim 23, further comprising a pin member insertable into an enlarged portion of an axial passageway extending through said second connector body, said clamping means comprising an annular shoulder surface formed between said enlarged portion of said axial passageway and a smaller portion thereof, and an end surface of said pin member which abuts with said shoulder surface, whereby force generated by progressively threadably engaging said first and second connector bodies is transmitted from said first connector body to said pin member to create a clamping force between said annular shoulder surface and the end surface of the pin member.

25. A fiber optic cable connector according to claim 24, wherein said compression plate contacts a front end of said first connector body on one side and an end portion of the pin member on the other side when the first and second connector bodies are progressively threadably engaged, to thereby effect said transmission of force from the first connector body to the pin member.

* * * * *